US012636951B2

(12) United States Patent
Shin

(10) Patent No.: US 12,636,951 B2
(45) Date of Patent: May 26, 2026

(54) IN-WHEEL DRIVING DEVICE

(71) Applicant: HYUNDAI MOBIS CO., LTD., Seoul (KR)

(72) Inventor: Kyeong Ho Shin, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 694 days.

(21) Appl. No.: 17/939,355

(22) Filed: Sep. 7, 2022

(65) Prior Publication Data

US 2023/0077725 A1 Mar. 16, 2023

(30) Foreign Application Priority Data

Sep. 10, 2021 (KR) ........................ 10-2021-0121225

(51) Int. Cl.
*B60K 17/04* (2006.01)
*F16D 65/12* (2006.01)

(52) U.S. Cl.
CPC .......... *B60K 17/046* (2013.01); *F16D 65/123* (2013.01)

(58) Field of Classification Search
CPC .......... B60K 17/046; B60K 2007/0038; B60K 2007/0092; B60K 7/0007; F16D 65/123; B60L 2220/44
See application file for complete search history.

(56) References Cited

U.S. PATENT DOCUMENTS 7,556,580 B2 * 7/2009 Saito ...................... H02K 7/116 475/149
8,132,636 B2 * 3/2012 Suzuki ..................... H02K 7/16 180/65.6
8,323,143 B2 * 12/2012 Schoon ................ B60K 17/046 475/330
8,932,166 B2 * 1/2015 Suzuki ..................... B60K 1/00 475/5
9,103,380 B2 * 8/2015 Hirano .................. B60B 35/121
9,726,057 B2 * 8/2017 Yamauchi .............. H02K 7/116
(Continued)

FOREIGN PATENT DOCUMENTS

JP 2013-71599 A 4/2013
WO WO 2013/047695 A1 4/2013

OTHER PUBLICATIONS

Extended European Search Report Issued on Feb. 14, 2023, in Counterpart European Patent Application No. 22194557.9 (43 Pages in English).

(Continued)

*Primary Examiner* — Derek D Knight
(74) *Attorney, Agent, or Firm* — NSIP Law

(57) ABSTRACT

Disclosed are in-wheel driving devices. The devices include a wheel bearing including a hub and an outer ring disposed outward of the hub in a radial direction, a speed reducer including a carrier coupled to a wheel, an annular sealing member disposed between the hub and the carrier and brought into close contact with the carrier to seal lubricant oil supplied into the speed reducer, and wheel bolts that couple the wheel and the carrier and pass through wheel bolt holes formed in the carrier spaced apart from each other in a circumferential direction. The sealing member is concentric with a first virtual circle passing through centers of the wheel bolt holes. The first virtual circle has a larger diameter than the sealing member such that the wheel bolts are located outward of the sealing member in the radial direction.

12 Claims, 7 Drawing Sheets

(56) References Cited

U.S. PATENT DOCUMENTS

| | | | | |
|---|---|---|---|---|
| 10,066,735 | B1 * | 9/2018 | Martin | F16H 57/12 |
| 10,876,596 | B1 | 12/2020 | Bonny et al. | |
| 11,772,479 | B2 * | 10/2023 | Li | B60K 17/046<br>180/65.51 |
| 12,168,394 | B2 * | 12/2024 | Shin | B60B 27/04 |
| 2009/0000840 | A1 * | 1/2009 | Murata | B60K 17/046<br>180/65.6 |

OTHER PUBLICATIONS

Korean Office Action issued on Apr. 10, 2026, in counterpart Korean Patent Application No. 10-2021-0121225 (5 pages in English, 5 pages in Korean).

* cited by examiner

IN-WHEEL DRIVING DEVICE

CROSS-REFERENCE TO RELATED APPLICATIONS

This application claims the benefit under 35 USC § 119(a) of Korean Patent Application No. 10-2021-0121225, filed on Sep. 10, 2021, in the Korean Intellectual Property Office, the entire disclosure of which is incorporated herein by reference for all purposes.

BACKGROUND

1. Field

The present disclosure relates to an in-wheel driving device, and more particularly, relates to an in-wheel driving device for coupling a wheel and a carrier.

2. Description of Related Art

An in-wheel driving device is a technology used in a vehicle (such as an electric vehicle) that uses electricity as a power source. The in-wheel driving device is a technology for directly driving a wheel with a motor provided in the wheel, unlike the method in which a wheel is rotated by transmission of power through an engine, a transmission, and a drive shaft in a gasoline or diesel vehicle.

Because the motor and a speed reducer that constitute the in-wheel driving device are disposed in the wheel together with existing parts, such as a suspension device, a steering device, a brake device, and the like, it is important to dispose the motor and the speed reducer in the wheel without interference with the existing parts by minimizing the sizes of the motor and the speed reducer while securing sufficient output and torque.

The speed reducer including a planetary gear may be mounted in a wheel bearing, and the wheel bearing may be coupled to the wheel through wheel bolts. The output torque of the speed reducer is transmitted to the wheel bearing, and the output of the speed reducer transmitted to the wheel bearing is transmitted to the wheel through the wheel bolts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an in-wheel driving device. The device includes a wheel bearing including a hub and an outer ring disposed outward of the hub in a radial direction, a speed reducer including a carrier coupled to a wheel, an annular sealing member disposed between the hub and the carrier and brought into close contact with the carrier to seal lubricant oil supplied into the speed reducer, and wheel bolts that couple the wheel and the carrier. The wheel bolts pass through wheel bolt holes that are formed in the carrier spaced apart from each other in a circumferential direction. The sealing member is concentric with a first virtual circle passing through centers of the wheel bolt holes. The first virtual circle has a larger diameter than the sealing member such that the wheel bolts are located outward of the sealing member in the radial direction.

The carrier may include a carrier body, and a carrier flange formed on an end portion of the carrier body in a direction from the wheel bearing toward the wheel bolts based on a direction of a central axis of the wheel bearing. The carrier flange extends from the carrier body in the radial direction and has wheel bolt holes formed within. The carrier flange also includes a seal close-contact surface with which the sealing member is brought into close contact. The seal close-contact surface is formed inward of the wheel bolt holes in the radial direction.

The speed reducer may include a sun gear connected to an input shaft and accommodated in the carrier body, a ring gear provided in the wheel bearing, and a planetary gear engaged between the sun gear and the ring gear and supported by the carrier body.

An outer circumferential surface of the ring gear may be brought into close contact with an inner circumferential surface of the hub.

The seal close-contact surface may be formed parallel to the central axis of the wheel bearing. The sealing member may include a first close-contact part brought into close contact with the seal close-contact surface, and a second close-contact part configured to extend from an end portion of the first close-contact part in a direction opposite to the direction from the wheel bearing toward the wheel bolts and brought into close contact with an outer circumferential surface of the ring gear.

The device may include fastening bolts that couple the carrier and the wheel bearing. The carrier flange may include fastening holes through which the fastening bolts pass. The fastening holes are spaced apart from each other in the circumferential direction.

The device may include a second virtual circle passing through centers of the plurality of fastening holes is concentric with the first virtual circle. The second virtual circle may have a larger diameter than the first virtual circle.

The outer ring may include an outer ring body configured to support the hub. The outer ring body may be rotatable relative to the hub with a rolling component between the outer ring body and the hub. The outer ring may also include an outer ring flange that extends from an outer surface of the outer ring body in the radial direction. The outer ring flange may have coupling holes through which the fastening bolts pass.

The device may include a transmission shaft that receives power from the input shaft of the sun gear. The speed reducer may also include a support bearing provided between an end portion of the transmission shaft in the direction from the wheel bearing toward the wheel bolts and an inner surface of the carrier.

The device may include a disk brake that provides a brake force to the wheel. The disk brake includes a disk coupled to the carrier and the outer ring through the fastening bolts and configured to rotate together with the carrier and a pad brought into close contact with the disk to generate a frictional force.

The disk may include a coupling portion coupled to the carrier that extends in the radial direction. The disk may include an extending portion that extends in the direction opposite to the direction from the wheel bearing toward the wheel bolts from an end portion of the coupling portion that faces the radial direction, and a frictional portion that extends from the extending portion in the radial direction and is brought into close contact with the pad. A support surface brought into close contact with an end portion of the outer ring flange that faces the radial direction is provided on an inner surface of the extending portion.

The outer ring, the carrier, and the disk may be sequentially coupled in the direction from the wheel bearing toward the wheel bolts by the fastening bolts.

Figure 1:
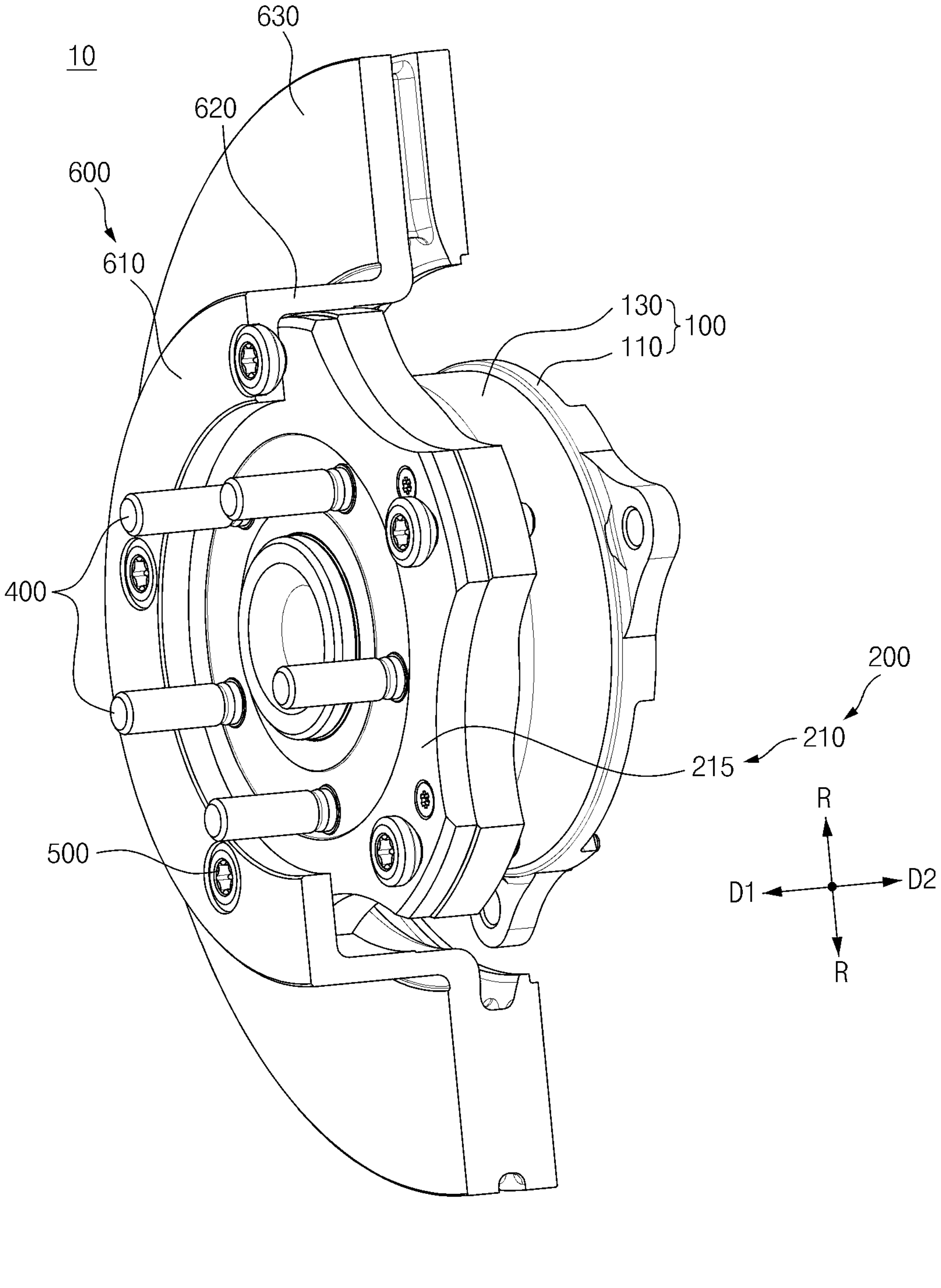
FIG. 1 is a perspective view illustrating an in-wheel driving device according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
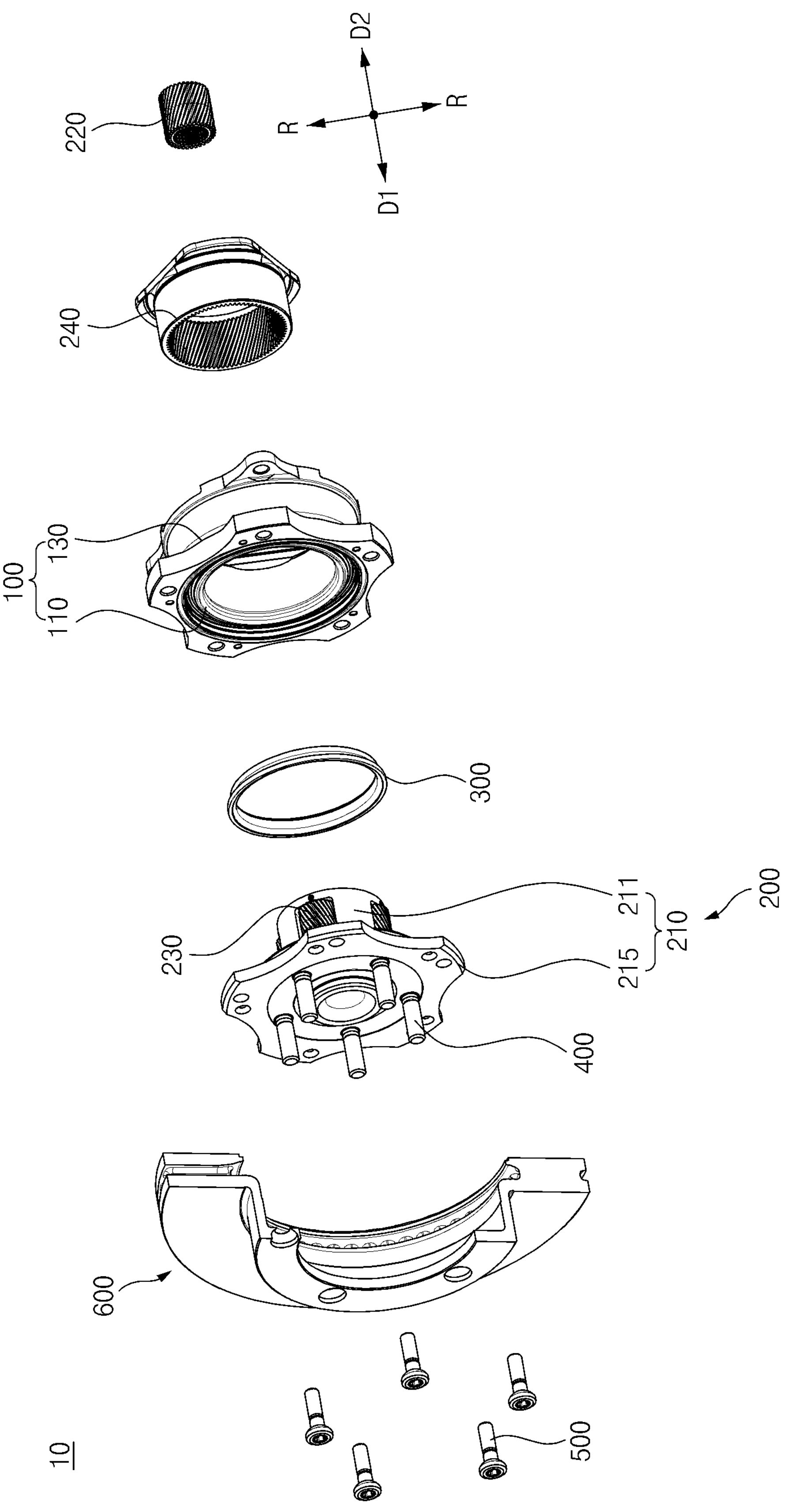
FIG. 2 is an exploded perspective view illustrating the in-wheel driving device of FIG. 1 according to an embodiment of the present disclosure.
Figure 3:
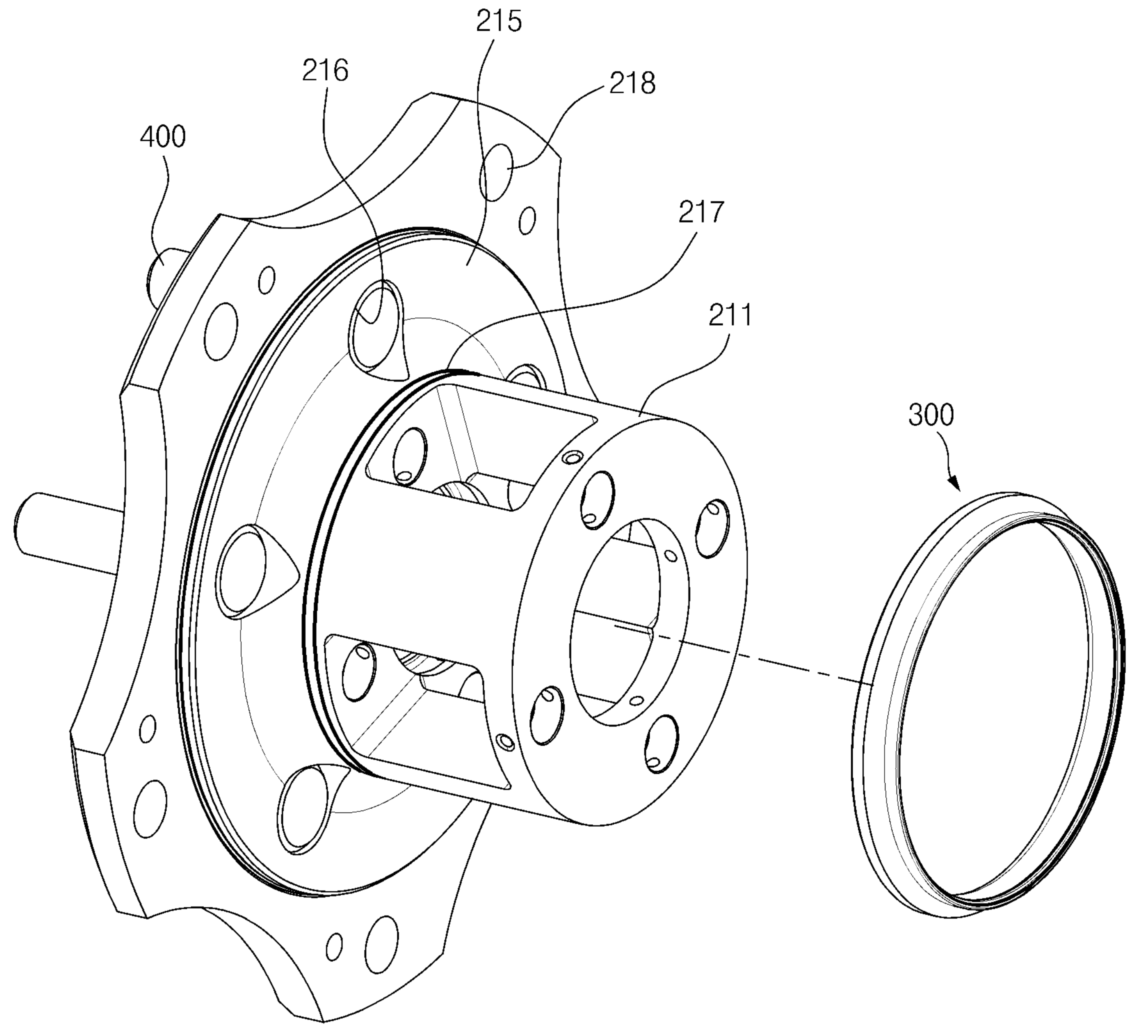
FIG. 3 is a perspective view illustrating a carrier and a sealing member according to an embodiment of the present disclosure.
Figure 4:
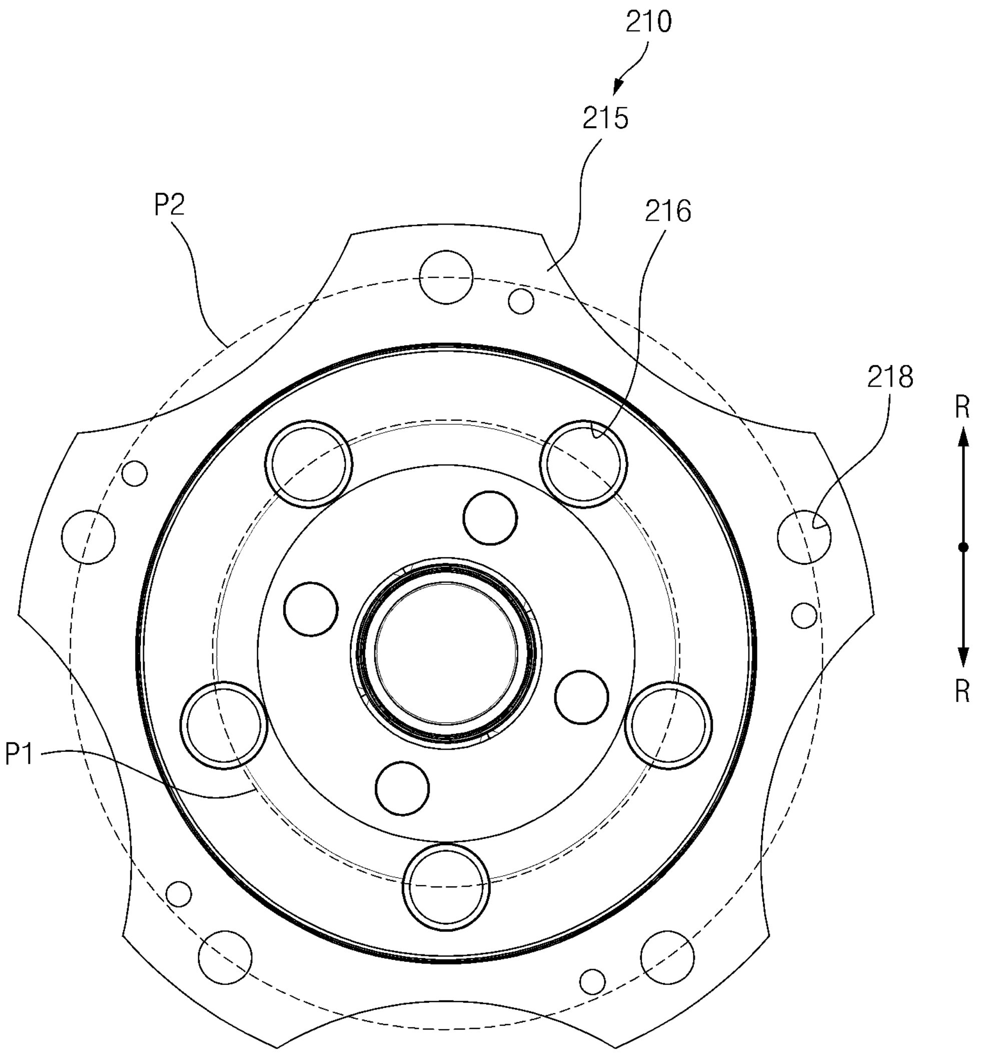
FIG. 4 is a plan view illustrating the carrier according to an embodiment of the present disclosure.
Figure 5:
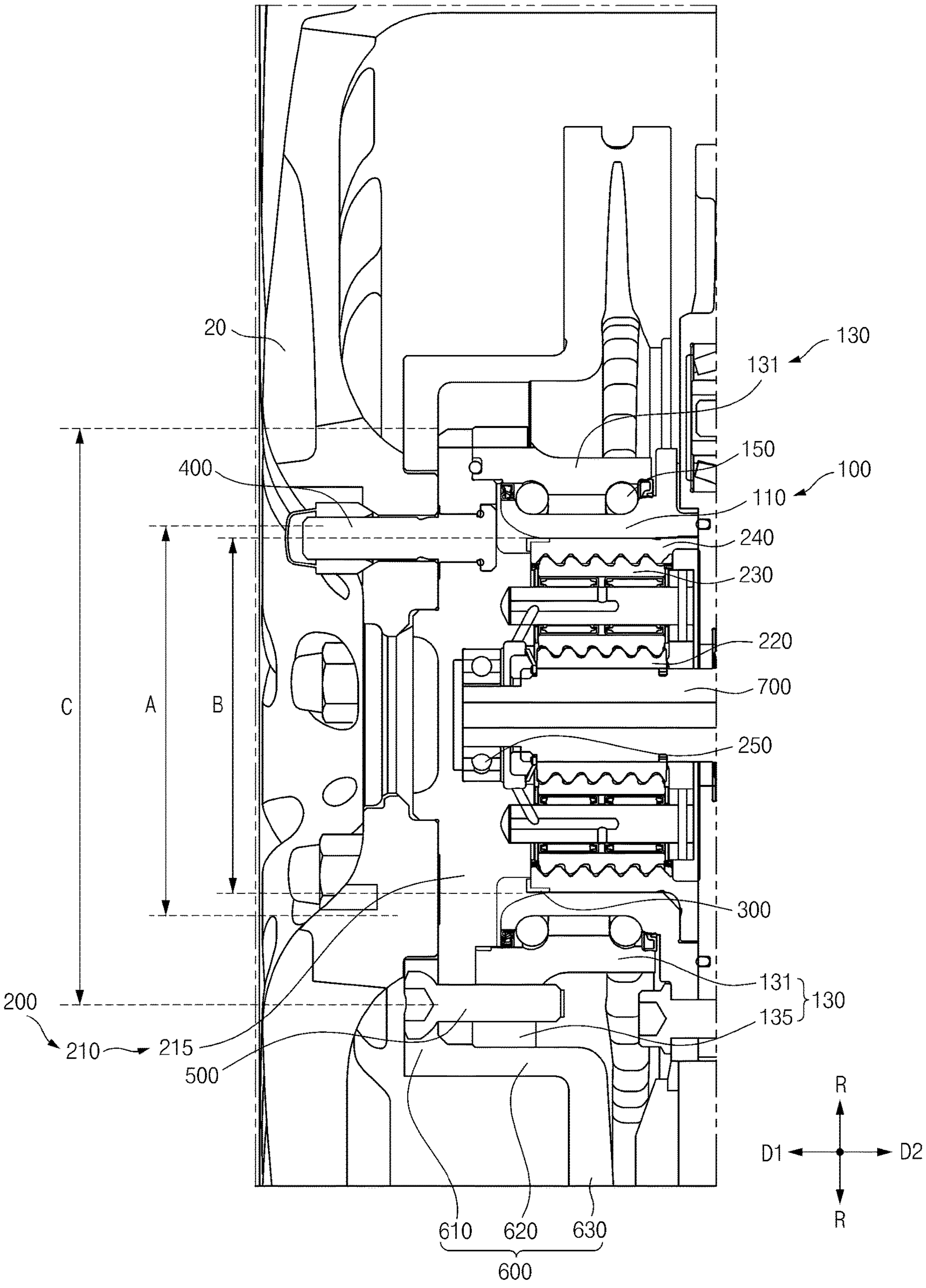
FIG. 5 is a sectional view illustrating the in-wheel driving device according to an embodiment of the present disclosure.
Figure 6:
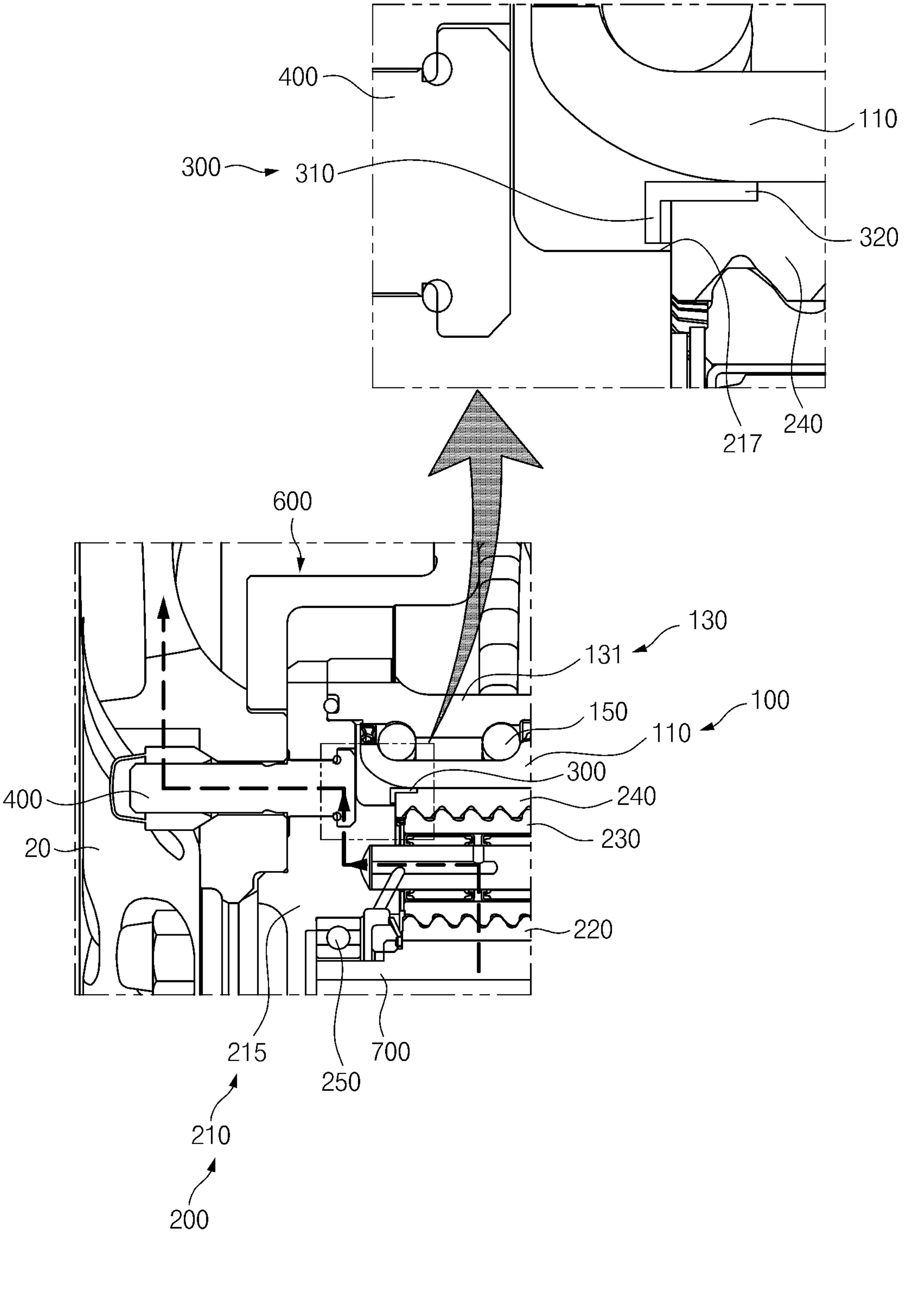
FIG. 6 is an enlarged sectional view of a portion of FIG. 5.
Figure 7:
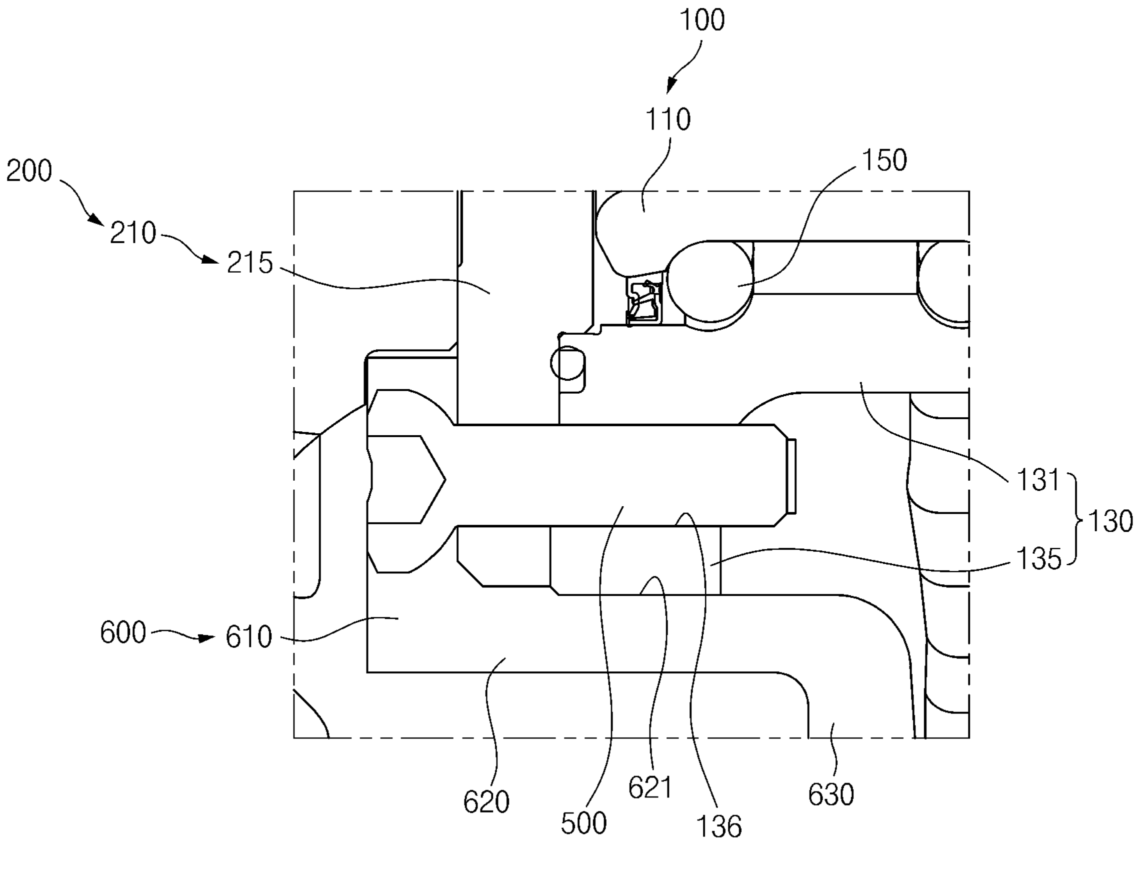
FIG. 7 is an enlarged sectional view of a portion of FIG. 5.

FIG. 1 is a perspective view illustrating an in-wheel driving device according to an embodiment of the present disclosure. FIG. 2 is an exploded perspective view illustrating the in-wheel driving device of FIG. 1 according to an embodiment of the present disclosure. FIG. 3 is a perspective view illustrating a carrier and a sealing member according to an embodiment of the present disclosure. FIG. 4 is a plan view illustrating the carrier according to an embodiment of the present disclosure. FIG. 5 is a sectional view illustrating the in-wheel driving device according to an embodiment of the present disclosure. FIG. 6 is an enlarged sectional view of a portion of FIG. 5. FIG. 7 is an enlarged sectional view of a portion of FIG. 5.

Referring to FIGS. 1 to 6, the in-wheel driving device 10 according to an embodiment of the present disclosure is a device provided in a wheel 20 to drive the wheel 20. The in-wheel driving device 10 includes a wheel bearing 100, a speed reducer 200, the sealing member 300, and wheel bolts 400.

The wheel bearing 100 includes a hub 110 and an outer ring 130 disposed outward of the hub 110 in a radial direction R. Here, the outer ring 130 may be a rotating component, and the hub 110 may be a non-rotating component. The in-wheel driving device 10 may include a motor (not illustrated) that generates a rotational force, and the outer ring 130 may be connected to an input shaft directly or indirectly connected to the motor and may be rotated by a driving force of the motor.

The speed reducer 200 includes the carrier 210 coupled to the wheel 20. The speed reducer 200 may be accommodated in the wheel bearing 100 and may include a plurality of gears supported by the carrier 210. The speed reducer 200 may be connected with the input shaft and may operate in conjunction with the motor. The speed reducer 200 may receive the rotational force generated by the motor and may reduce and output the rotational force. The power reduced by the speed reducer 200 may be transmitted to the wheel bearing 100.

To seal lubricant oil supplied into the speed reducer 200, the sealing member 300 may be disposed between the hub

110 and the carrier 210, may be brought into close contact with the carrier 210, and may be formed in an annular shape.

Specifically, the lubricant oil for smoothly driving the plurality of gears may be supplied into the speed reducer 200, and the sealing member 300 may serve to seal the lubricant oil in the speed reducer 200. Furthermore, the sealing member 300 may prevent infiltration of external foreign matter into the speed reducer 200. The sealing member 300 may be formed in an annular shape to surround the periphery of the speed reducer 200. For example, the sealing member 300 may be formed of an elastic material such as rubber. However, the material of the sealing member 300 is not limited thereto.

The wheel bolts 400 are provided to couple the wheel 20 and the carrier 210 and pass through a plurality of wheel bolt holes 216 that are formed in the carrier 210 so as to be spaced apart from each other in a circumferential direction.

Specifically, the wheel bolts 400 may be members that directly connect the carrier 210 with the wheel 20 and may be sequentially coupled to the carrier 210 and the wheel 20. The plurality of wheel bolt holes 216 may be formed in the carrier 210 so as to be spaced apart from each other in the circumferential direction, and through-holes corresponding to the wheel bolt holes 216 may be formed in the wheel 20. The wheel bolts 400 may pass through the wheel bolt holes 216 and the through-holes and may couple the wheel 20 and the carrier 210.

Accordingly, the output of the speed reducer 200 may be directly transmitted to the wheel 20, and thus an existing wheel may be used as it is even when the in-wheel driving system according to the present disclosure is applied. Specifically, in the case of an in-wheel driving system in the related art, a wheel is fastened with a wheel bearing, and a speed reducer is embedded in the wheel bearing. Therefore, the size of the wheel bearing is increased, and the pitch circle diameter (PCD) of wheel bolts coupling the wheel and the wheel bearing is also increased. Due to this, the existing wheel cannot be used, and a wheel for the in-wheel driving system has to be separately manufactured.

According to the present disclosure, the wheel bolts 400 may be coupled to the wheel 20 and the carrier 210, and thus the wheel 20 and the carrier 210 may be directly coupled. To this end, the outer diameter of the carrier 210 may be expanded to correspond to the outer diameter of the wheel bearing 100. In this case, the output of the speed reducer 200 may be directly transmitted to the wheel 20 via a sun gear 220 to be described below, the carrier 210, and the wheel bolts 400. Furthermore, according to the present disclosure, the carrier 210 may be directly coupled to the wheel 20, and thus the positions of the wheel bolts 400 may not be changed even when the size of the wheel bearing 100 is increased due to the speed reducer 200. Accordingly, the PCD of the wheel bolts 400 may be the same as an existing one. As a result, the existing wheel may be used as it is, and due to this, an unnecessary increase in cost may be prevented.

The sealing member 300 is concentric with a first virtual circle P1 passing through the centers of the plurality of wheel bolt holes 216. That is, the center of the first virtual circle P1 and the center of the sealing member 300 may coincide with each other, and the centers may be located on the central axis of the wheel bearing 100.

The diameter A of the first virtual circle P1 may be formed to be larger than the diameter B of the sealing member 300 such that the wheel bolts 400 are located outward of the sealing member 300 in the radial direction R (refer to FIG. 5).

In other words, the diameter B of the sealing member 300 may be formed to be smaller than the diameter A of the first virtual circle P1. This is because it may be difficult to seal the lubricant oil in the speed reducer 200 when the wheel bolts 400 that pass through the carrier 210 and that are fastened to the wheel 20 are disposed inward of the sealing member 300. Accordingly, according to the present disclosure, the position in which the sealing member 300 is brought into close contact with the carrier 210 may be distinguished from the mounting positions of the wheel bolts 400 and may be located inward of the wheel bolts 400. Here, the position in which the sealing member 300 is brought into close contact with the carrier 210 refers to the position in which the sealing member 300 and the carrier 210 make contact with each other. Thus, the lubricant oil supplied into the speed reducer 200 may be effectively sealed.

Hereinafter, the direction from the wheel bearing 100 toward the wheel bolts 400 based on the direction of the central axis of the wheel bearing 100 is defined as the first direction D1, and the direction opposite to the first direction D1 is defined as the second direction D2.

The carrier 210 may include a carrier body 211 and a carrier flange 215.

The carrier body 211 may be provided such that the plurality of gears included in the speed reducer 200 are mounted therein.

The carrier flange 215 may be formed on an end portion of the carrier body 211 in the first direction D1, may extend from the carrier body 211 in the radial direction R, and may have the wheel bolt holes 216 formed therein.

The carrier flange 215 may be expanded from the carrier body 211 in the radial direction R so as to be larger than the pitch circle diameter (PCD) of wheel volts mounted to an existing wheel. The carrier 210 may be directly coupled to the wheel 20 by the expanded carrier flange 215. The wheel bolts 400 may be mounted on the carrier flange 215, and the sealing member 300 may be brought into close contact with the carrier flange 215.

Specifically, the carrier flange 215 may further include a seal close-contact surface 217 that is formed inward of the wheel bolt holes 216 in the radial direction R and with which the sealing member 300 is brought into close contact. For example, the seal close-contact surface 217 may be formed parallel to the central axis of the wheel bearing 100, but is not limited thereto.

The speed reducer 200 may further include the sun gear 220, a ring gear 240, and a planetary gear 230 that are connected to the carrier 210.

The sun gear 220 may be connected to the input shaft and may be accommodated in the carrier body 211. For example, the sun gear 220 may be directly connected with the input shaft, or may be connected to a transmission shaft 700 of a transmission gear connected to the input shaft. The transmission shaft 700 or the input shaft may be spline-coupled with the sun gear 220 and may rotate together the sun gear 220.

The ring gear 240 may be provided in the wheel bearing 100. Specifically, the outer circumferential surface of the ring gear 240 may be brought into close contact with the inner circumferential surface of the hub 110. Accordingly, the ring gear 240 may be a non-rotating component together with the hub 110.

The planetary gear 230 may be engaged between the sun gear 220 and the ring gear 240 and may be supported by the carrier body 211. Specifically, the planetary gear 230 may be installed through the inside and outside of the carrier body 211 and may be engaged between the sun gear 220 and the ring gear 240. The planetary gear 230 may rotate while revolving around the sun gear 220 when the sun gear 220 rotates. A rotary shaft of the planetary gear 230 may be installed in the carrier 210, and the carrier 210 may rotate together when the planetary gear 230 revolves. A rotational force of the carrier 210 may be transmitted to the wheel 20 by the wheel bolts 400.

The sealing member 300 may be divided into a first close-contact part 310 and a second close-contact part 320.

The first close-contact part 310 may be brought into close contact with the seal close-contact surface 217. The first close-contact part 310 may extend from an end portion of the second close-contact part 320 in the second direction D2 and may be brought into close contact with the outer circumferential surface of the ring gear 240. The sealing member 300 may be mounted on the ring gear 240 and may be brought into close contact with the carrier 210. Accordingly, the sealing member 300 is fixed together with the ring gear 240 that is a non-rotating component, and the carrier 210 is rotated in the state of being brought into close contact with the sealing member 300.

Due to this structure, the sealing member 300 may seal between the carrier 210 and the ring gear 240. Accordingly, leakage of the lubricant oil introduced into the speed reducer 200 may be effectively prevented. However, the shape of the sealing member 300 is not limited to the above-described example, and various changes and modifications can be made as long as the sealing member 300 is capable of sealing between the carrier 210 and the ring gear 240.

The in-wheel driving device 10 according to the present disclosure may further include fastening bolts 500. The fastening bolts 500 may couple the carrier 210 and the wheel bearing 100. The carrier flange 215 may further include a plurality of fastening holes 218 that are formed to be spaced apart from each other in the circumferential direction and through which the fastening bolts 500 pass.

Specifically, because the output of the speed reducer 200 is directly transmitted to the wheel 20 by the wheel bolts 400, a component capable of transmitting the output of the speed reducer 200 to the wheel bearing 100 is required. Accordingly, the in-wheel driving device 10 according to the present disclosure may further include the fastening bolts 500, and the fastening bolts 500 may serve to couple the carrier 210 and the wheel bearing 100. However, as described above, the position of the PCD of the wheel bolts 400 needs to remain constant irrespective of a change in the size of the wheel bearing 100 depending on the speed reducer 200, and therefore a limitation on the positions of the fastening bolts 500 is required.

Accordingly, a second virtual circle P2 passing through the centers of the plurality of fastening holes 218 may be concentric with the first virtual circle P1, and the diameter C of the second virtual circle P2 may be formed to be larger than the diameter A of the first virtual circle P1.

The wheel bolts 400 may be disposed on the carrier 210 so as to be located inward of the fastening bolts 500 and may be installed at predetermined positions irrespective of the size of the wheel bearing 100 to which the fastening bolts 500 are fastened.

The outer ring 130 may include an outer ring body 131 and an outer ring flange 135.

The outer ring body 131 may support the hub 110 and may be rotatable relative to the hub 110 with a rolling component 150 between the outer ring body 131 and the hub 110. The outer ring flange 135 may extend from the outer surface of the outer ring body 131 in the radial direction R and may have coupling holes 136 formed therein through which the fastening bolts 500 pass. The fastening bolts 500 may be fastened through the coupling holes 136 and the fastening holes 218 to couple the outer ring 130 and the carrier 210.

The in-wheel driving device 10 according to the present disclosure may further include the transmission shaft 700 configured to receive power from the input shaft of the sun gear 220. The speed reducer 200 may further include a support bearing 250, and the support bearing 250 may be provided between an end portion of the transmission shaft 700 in the first direction D1 and the inner surface of the carrier 210. Thus, deformation of the carrier 210 by the load of the wheel 20 may be minimized.

Specifically, because the carrier 210 and the wheel 20 are directly coupled by the wheel bolts 400 to transmit a driving force, the carrier 210 may be deformed by the load of the wheel 20. When the carrier 210 is deformed, the planetary gear 230 may be eccentric between the sun gear 220 and the ring gear 240, and therefore noise and degradation in durability may occur.

Accordingly, the transmission shaft 700 of the transmission gear directly or indirectly connected with the input shaft and installed in the motor housing may extend to an end portion of the carrier 210 that faces the first direction D1, and the support bearing 250 may be provided between the end portion of the transmission shaft 700 in the first direction D1 and the inner surface of the carrier 210 to support the carrier 210. Thus, deformation of the carrier 210 by the load of the wheel 20 may be minimized.

The in-wheel driving device 10 according to the present disclosure may further include a disk brake configured to provide a brake force to the wheel 20.

The disk brake may further include a disk 600, a pad (not illustrated), and a hydraulic device (not illustrated).

The disk 600 may be coupled to the carrier 210 and the outer ring 130 through the fastening bolts 500 and may rotate together with the carrier 210. The pad may be brought into close contact with the disk 600 to generate a frictional force.

The hydraulic device may bring the pad into close contact with the disk 600 and may include, for example, a cylinder and a caliper. The pad may apply a brake force to the wheel 20 while being brought into close contact with or spaced apart from the disk 600 by the hydraulic device.

Specifically, the disk 600 may include a coupling portion 610, an extending portion 620, and a frictional portion 630.

The coupling portion 610 may be coupled to the carrier 210 and may extend in the radial direction R, and the extending portion 620 may extend in the second direction D2 from an end portion of the coupling portion 610 that faces the radial direction R. The frictional portion 630 may extend from the extending portion 620 in the radial direction R and may be brought into close contact with the pad.

At this time, the outer ring 130, the carrier 210, and the coupling portion 610 of the disk 600 may be sequentially coupled in the first direction D1 by the fastening bolts 500.

A support surface 621 brought into close contact with an end portion of the outer ring flange 135 that faces the radial direction R may be provided on the inner surface of the extending portion 620.

Specifically, as the end portion of the outer ring flange 135 that faces the radial direction R is brought into close contact with the support surface 621 provided on the inner surface of the extending portion 620 of the disk 600, a central portion of the disk 600 may coincide with a central portion of the outer ring 130. Accordingly, the disk brake may be centered on the wheel bearing 100. More specifically, in the related art, a wheel bearing and a wheel are directly coupled, and a disk has a structure interposed and coupled between the wheel bearing and the wheel. In this case, a support surface for centering the disk is provided inward of the PCD of wheel bolts. However, in the present disclosure, separately from the wheel 20, the disk 600 is coupled with the outer ring 130 of the wheel bearing 100 by the fastening bolts 500 passing through the carrier 210, and the PCD of the fastening bolts 500 is formed to be larger than the PCD of the wheel bolts 400. Accordingly, a support portion for centering the disk brake needs to be provided outward of the fastening bolts 500. According to the present disclosure, to center the disk brake, the outer ring 130 may be supported on the support surface 621 of the extending portion 620 of the disk 600. Thus, when the disk brake is coupled with the wheel bearing 100 and the carrier 210, the disk brake may be coupled while the outer ring flange 135 is brought into close contact with the support surface 621 and the disk brake is concentric with the wheel bearing 100 and the carrier 210.

As described above, the wheel and the carrier may be directly coupled by the wheel bolts. Accordingly, the in-wheel driving device according to the embodiment of the present disclosure may use an existing wheel as it is, thereby preventing an unnecessary increase in cost.

In addition, according to the present disclosure, the in-wheel driving device may effectively seal the lubricant oil supplied into the speed reducer.

The present disclosure has been made to solve the above-mentioned problems occurring in the prior art while advantages achieved by the prior art are maintained intact.

An aspect of the present disclosure provides an in-wheel driving device for preventing an unnecessary increase in cost by using an existing wheel as it is in an in-wheel driving system.

Another aspect of the present disclosure provides an in-wheel driving device for effectively sealing lubricant oil supplied into a speed reducer.

The technical problems to be solved by the present disclosure are not limited to the aforementioned problems, and any other technical problems not mentioned herein will be clearly understood from the following description by those skilled in the art to which the present disclosure pertains.

In instances in which the present disclosure is not implemented, when the planetary gear is disposed in the wheel bearing, the outer diameter of the wheel bearing may be increased, and therefore the pitch circle diameter (PCD) of the wheel bolts fastening the wheel and the wheel bearing may be increased. In these instances, the PCD may be the diameter of a pitch circle passing through the centers of wheel bolt fastening holes arranged in the circumferential direction. When the PCD of the wheel bolts is increased in these instances, an existing standard wheel cannot be used, and a dedicated special wheel for an in-wheel system may have to be manufactured. The present disclosure provides a technology for applying an existing mass-produced wheel as it is by making the PCD of wheel bolts the same as an existing PCD while increasing a speed reduction ratio using a plurality of gears is required. Thus, the present disclosure may eliminate the requirement of a dedicated special wheel.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An in-wheel driving device, the device comprising:

a wheel bearing including a hub and an outer ring disposed outward of the hub in a radial direction;

a speed reducer including a carrier coupled to a wheel;

an annular sealing member disposed between the hub and the carrier and brought into close contact with the carrier to seal lubricant oil supplied into the speed reducer; and wheel bolts configured to couple the wheel and the carrier, wherein the wheel bolts pass through a plurality of wheel bolt holes formed in the carrier spaced apart from each other in a circumferential direction; and fastening bolts configured to couple the carrier and the wheel bearing, wherein the sealing member is concentric with a first virtual circle passing through centers of the plurality of wheel bolt holes, and wherein the first virtual circle has a larger diameter than the sealing member such that the wheel bolts are located outward of the sealing member in the radial direction, wherein the carrier includes:

a carrier body; and a carrier flange formed on an end portion of the carrier body in a direction from the wheel bearing toward the wheel bolts based on a direction of a central axis of the wheel bearing and configured to extend from the carrier body in the radial direction, the carrier flange having the wheel bolt holes formed therein, and wherein the carrier flange includes a plurality of fastening holes through which the fastening bolts pass, the plurality of fastening holes being spaced apart from each other in the circumferential direction.

2. The device of claim 1, wherein the carrier flange further includes a seal close-contact surface with which the sealing member is brought into close contact, the seal close-contact surface being formed inward of the wheel bolt holes in the radial direction.

3. The device of claim 2, wherein the speed reducer further includes:

a sun gear connected to an input shaft and accommodated in the carrier body;

a ring gear provided in the wheel bearing; and a planetary gear engaged between the sun gear and the ring gear and supported by the carrier body.

4. The device of claim 3, wherein an outer circumferential surface of the ring gear is brought into close contact with an inner circumferential surface of the hub.

5. The device of claim 3, wherein the seal close-contact surface is formed parallel to the central axis of the wheel bearing, and wherein the sealing member includes:

a first close-contact part brought into close contact with the seal close-contact surface; and a second close-contact part configured to extend from an end portion of the first close-contact part in a direction opposite to the direction from the wheel bearing toward the wheel bolts and brought into close contact with an outer circumferential surface of the ring gear.

6. The device of claim 2, wherein a second virtual circle passing through centers of the plurality of fastening holes is concentric with the first virtual circle, and wherein the second virtual circle has a larger diameter than the first virtual circle.

7. The device of claim 2, wherein the outer ring includes:

an outer ring body configured to support the hub, the outer ring body being rotatable relative to the hub with a rolling component between the outer ring body and the hub; and an outer ring flange configured to extend from an outer surface of the outer ring body in the radial direction, the outer ring flange having coupling holes formed therein through which the fastening bolts pass.

8. The device of claim 3, further comprising:

a transmission shaft configured to receive power from the input shaft of the sun gear, wherein the speed reducer further includes a support bearing provided between an end portion of the transmission shaft in the direction from the wheel bearing toward the wheel bolts and an inner surface of the carrier.

9. The device of claim 7, further comprising:

a disk brake configured to provide a brake force to the wheel, wherein the disk brake includes:

a disk coupled to the carrier and the outer ring through the fastening bolts and configured to rotate together with the carrier; and a pad brought into close contact with the disk to generate a frictional force.

10. The device of claim 9, wherein the disk includes:

a coupling portion coupled to the carrier and configured to extend in the radial direction;

an extending portion configured to extend in the direction opposite to the direction from the wheel bearing toward the wheel bolts from an end portion of the coupling portion configured to face the radial direction; and a frictional portion configured to extend from the extending portion in the radial direction and to be brought into close contact with the pad, and wherein a support surface brought into close contact with an end portion of the outer ring flange configured to face the radial direction is provided on an inner surface of the extending portion.

11. The device of claim 9, wherein the outer ring, the carrier, and the disk are sequentially coupled in the direction from the wheel bearing toward the wheel bolts by the fastening bolts.

12. An in-wheel driving device, the device comprising:

a wheel bearing including a hub and an outer ring disposed outward of the hub in a radial direction;

a speed reducer including a carrier coupled to a wheel;

an annular sealing member disposed between the hub and the carrier and brought into close contact with the carrier to seal lubricant oil supplied into the speed reducer; and wheel bolts configured to couple the wheel and the carrier, wherein the wheel bolts pass through a plurality of wheel bolt holes formed in the carrier spaced apart from each other in a circumferential direction, wherein the sealing member is concentric with a first virtual circle passing through centers of the plurality of wheel bolt holes, wherein the first virtual circle has a larger diameter than the sealing member such that the wheel bolts are located outward of the sealing member in the radial direction, wherein the carrier includes:

a carrier body; and a carrier flange formed on an end portion of the carrier body in a direction from the wheel bearing toward the wheel bolts based on a direction of a central axis of the wheel bearing and configured to extend from the carrier body in the radial direction, the carrier flange having the wheel bolt holes formed therein, wherein the carrier flange further includes a seal close-contact surface with which the sealing member is brought into close contact, the seal close-contact surface being formed inward of the wheel bolt holes in the radial direction, wherein the speed reducer further includes:

a sun gear connected to an input shaft and accommodated in the carrier body;

a ring gear provided in the wheel bearing; and a planetary gear engaged between the sun gear and the ring gear and supported by the carrier body, wherein the device further comprises a transmission shaft configured to receive power from the input shaft of the sun gear, and wherein the speed reducer further includes a support bearing provided between an end portion of the transmission shaft in the direction from the wheel bearing toward the wheel bolts and an inner surface of the carrier.

* * * * *